(12) United States Patent
Falsafi

(10) Patent No.: US 10,454,503 B1
(45) Date of Patent: Oct. 22, 2019

(54) SYSTEM AND METHOD FOR WIRELESS COMMUNICATION WITH IMPROVED PROTOCOL SUPPORT

(71) Applicant: Aram Falsafi, Seattle, WA (US)

(72) Inventor: Aram Falsafi, Seattle, WA (US)

(73) Assignee: Aram Falsafi, Seattle, WA (US)

( * ) Notice: Subject to any disclaimer, the term of this patent is extended or adjusted under 35 U.S.C. 154(b) by 0 days.

(21) Appl. No.: 15/983,855

(22) Filed: May 18, 2018

(51) Int. Cl.
*H04B 1/00* (2006.01)
*H04L 27/12* (2006.01)
*H04L 29/06* (2006.01)

(52) U.S. Cl.
CPC ......... *H04B 1/0039* (2013.01); *H04L 27/122* (2013.01); *H04L 69/18* (2013.01)

(58) Field of Classification Search
CPC ...... H04B 5/0039; H04L 27/122; H04L 69/18
See application file for complete search history.

(56) References Cited

U.S. PATENT DOCUMENTS 9,736,281 B2 * 8/2017 Holden ................ G06F 13/385

* cited by examiner

*Primary Examiner* — Kabir A Timory

(57) ABSTRACT

System and method are described for implementing, in software and running on a general purpose processor, a communication protocol and using a communication system that supports one or more different communication protocols to transmit and receive data complaint with said communication protocol implemented in software.

18 Claims, 6 Drawing Sheets

SYSTEM AND METHOD FOR WIRELESS COMMUNICATION WITH IMPROVED PROTOCOL SUPPORT

BACKGROUND

Technical Field of the Disclosure

The present disclosure is in the technical field of wireless communication. More particularly, the present disclosure relates to support of multiple protocols in a communication device, where the initial hardware may support a subset of said protocols, and other protocols are implemented in software on a general-purpose processor.

Description of the Related Art

In the current state of the art, dedicated hardware exists supporting one or more communication protocols, and said hardware is used exclusively for communication using the one or more protocols that said hardware is designed to support.

In a non-limiting example, an integrated circuit chip may support one or more variants of the WIFI protocol, such as IEEE standards 802.11b, 802.11g, 802.11n, and 802.11ac, and is typically used to provide WIFI service, either in an access point or in a mobile device.

An integrated circuit chip supporting the WIFI protocol typically includes, in its transmission path, a physical layer or PHY element that receives digital data bits from a higher layer protocol implementation, and generates a modulated signal, in digital form, and at baseband carrier frequency. This baseband modulated signal typically takes the form of so-called real and imaginary elements, also known as I (in-phase) and Q (quadrature) components. The I and Q components of the baseband signal are typically then fed into a digital-to-analog converter (DAC) that converts the digital I and Q signals into analog I and Q signals, which are in turn fed to a radio frequency modulator, which converts them into a radio frequency signal. This radio frequency signal is then fed to a radio frequency antenna which transmits the signal by means of electromagnetic waves to a remote device.

The same integrated circuit chip supporting the WIFI protocol typically includes, in its reception path, a radio frequency antenna which receives a radio-frequency signal from a remote device and feeds this signal to a radio frequency demodulator which converts the signal to an analog baseband signal. The analog baseband signal is then fed to an analog-to-digital converter (ACD) which samples and quantizes the signal and generates digital I and Q signals. The digital I and Q signals are then passed to a physical layer or PHY element which extracts digital bits and sends them to a higher layer protocol implementation.

In another non-limiting example, an integrated circuit chip may support one or more variants of the WIFI protocol, as well as a second communication protocol such as Bluetooth, and this chip is typically used to provide simultaneous support for both WIFI and Bluetooth, usually (though not exclusively) in a mobile device. In this example, all of the elements described in the first example above are typically implemented twice, once for each protocol supported, although some hardware elements may be shared by the two implementations.

A limitation of the current state of the art, as described in the above examples, is that some of the lower layers of the supported communication protocols (for example the physical layer implementations of the communication protocols) are designed directly into the communication hardware. Therefore, as new protocols and standards are created, new hardware must be designed, and equipment that has incorporated older hardware will not be able to support the new communication protocols and standards.

An alternative implementation of communication systems is through what is known to those of ordinary skill in the art as Software Defined Radio or SDR. In typical SDR systems, and according to the current state of the art, the radio modulation and demodulation functions as well as the analog-to-digital and digital-to-analog conversions are implemented in hardware, while communication protocols, including physical layer processing, are implemented in software. It is known in the art that implementation of communication protocols in software allows much greater flexibility in supporting future communication protocols and standards through simple software upgrades.

The primary disadvantage of SDR systems, as related to the current disclosure, is that SDR hardware (comprising primarily of radio frequency modulators and demodulators and analog-to-digital and digital-to-analog converters) is generally more expensive than the dedicated hardware described in the earlier examples, due to its much lower production volume.

BRIEF SUMMARY OF THE EMBODIMENTS

The present disclosure is a wireless communication device that is implemented using low-cost commodity hardware designed to support one or more communication protocols, while ensuring support for future communication protocols that may not have been standardized when the low-cost hardware used in the wireless communication device was designed.

In this disclosure, the term "Wireless Communication Device" is used in a generic sense to refer to any equipment that implements one or more wireless communication protocols. As such, the following items can all be considered non-limiting examples of a "Wireless Communication Device"

Laptop computer with WIFI radio
Cellular handset with or without WIFI and/or Bluetooth support
WIFI access point A wireless communication device incorporating this disclosure uses an existing communication system that implements support for one or more layers of one or more communication protocols, as well as a general purpose processor where different communication protocols can be implemented in software. In one non-limiting embodiment of this disclosure, the general purpose processor instructs the communication system to disable one or more of its communication protocols, and connect the output of its analog-to-digital converter and the input of its digital-to-analog converter directly to the general purpose processor, where one or more different communication protocols are implemented in software.

In one non-limiting example, the communication protocol or protocols implemented in software and executed on the general purpose processor are upgraded versions of the communication protocol or protocols implemented in the communication system. In another non-limiting example, the communication protocol or protocols implemented in software and executed on the general purpose processor are unrelated to the communication protocol or protocols implemented in the communication system.

DETAILED DESCRIPTION

Reference will now be made in detail to one or more embodiments of the present disclosure. While the disclosure will be described with respect to these embodiments, it should be understood that the disclosure is not limited to any particular embodiment. On the contrary, the present disclosure includes alternatives, modifications, and equivalents as may come within the spirit and scope of the appended claims. Furthermore, in the following description, numerous specific details are set forth to provide a thorough understanding of the present disclosure. The present disclosure may be practiced without some or all of these specific details. In other instances, well-known structures and principles of operation have not been described in detail, so as to avoid obscuring the disclosure.

Unless otherwise defined, all terms used herein have the same meaning as commonly understood by one of ordinary skills in the art to which the exemplary embodiment(s) belongs.

Figure 1:
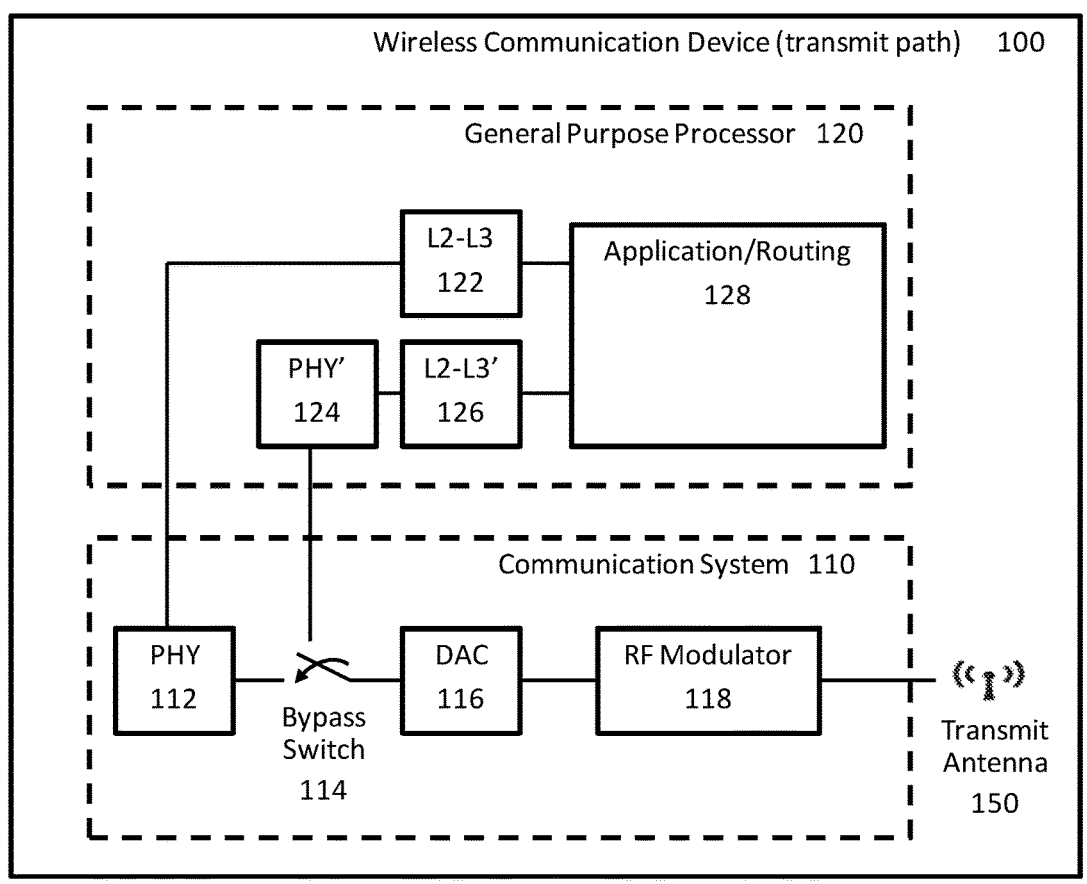
FIG. 1 shows a system diagram describing the transmit path of a non-limiting exemplary embodiment of the present disclosure which includes a communication system supporting a single communication protocol.

Referring to the present disclosure, FIG. 1 shows the transmit path 100 of a typical wireless communication device in one exemplary implementation of this disclosure. The transmit path 100 consists of a communication system 110 and a general purpose processor 120. The wireless communication device depicted in FIG. 1 could be an end device such as a laptop computer with wireless connectivity or a mobile handset, in which case the highest layer of the communication protocol, implemented in module 128, would consist of application layer software such as a web browser, an email application or other application software. Alternatively, the wireless communication device depicted in FIG. 1 could be a router that provides connectivity between other wireless devices (not shown in the figure) and a wired network (also not shown in the figure), in which case the highest layer of the communication protocol, implemented in module 128, would consist of a routing algorithm.

Referring again to FIG. 1, the application/routing module 128 is coupled to a module implementing higher layer communication protocols, depicted as layers 2 and 3 (L2-L3) of a typical communication protocol (item 122 of FIG. 1). Under operation per the current state of the art, module 122 is coupled to a module 112 implementing a physical layer protocol in the communication system 110. Again under operation per the current state of the art, bypass switch 114 would be in the lower position, coupling the output of PHY module 112 to the input of a digital-to-analog converter (DAC) 116. Finally, the analog output of the DAC 116 is coupled to the input of a radio frequency modulator 118, and the radio frequency signal from the output of the radio frequency demodulator 118 is coupled to a transmit antenna 150, resulting in the transmission, over the air, of a radio frequency signal compatible with the protocol whose physical layer is implemented in module 112 and whose higher layer protocols are implemented in module 122.

Referring again to FIG. 1, and according to one embodiment of the present disclosure, control software executed in general purpose processor 120 (and not depicted in FIG. 1) will instruct bypass switch 114 to disconnect the input of DAC 116 from the output of physical layer module 112, and instead connect the input of DAC 116 to the output of a different physical layer module 124 which implements (in software executed on the general purpose processor 120) the physical layer PHY' of a communication protocol that is different from the communication protocol whose physical layer PHY is implemented in module 112 of communication system 110. The input of physical layer module 124 is connected to the output of a different higher layer protocol (labeled L2-L3') implemented in software in module 126. Finally, the input of higher layer protocol module 126 is connected to the output of application/routing module 128.

Figure 2:
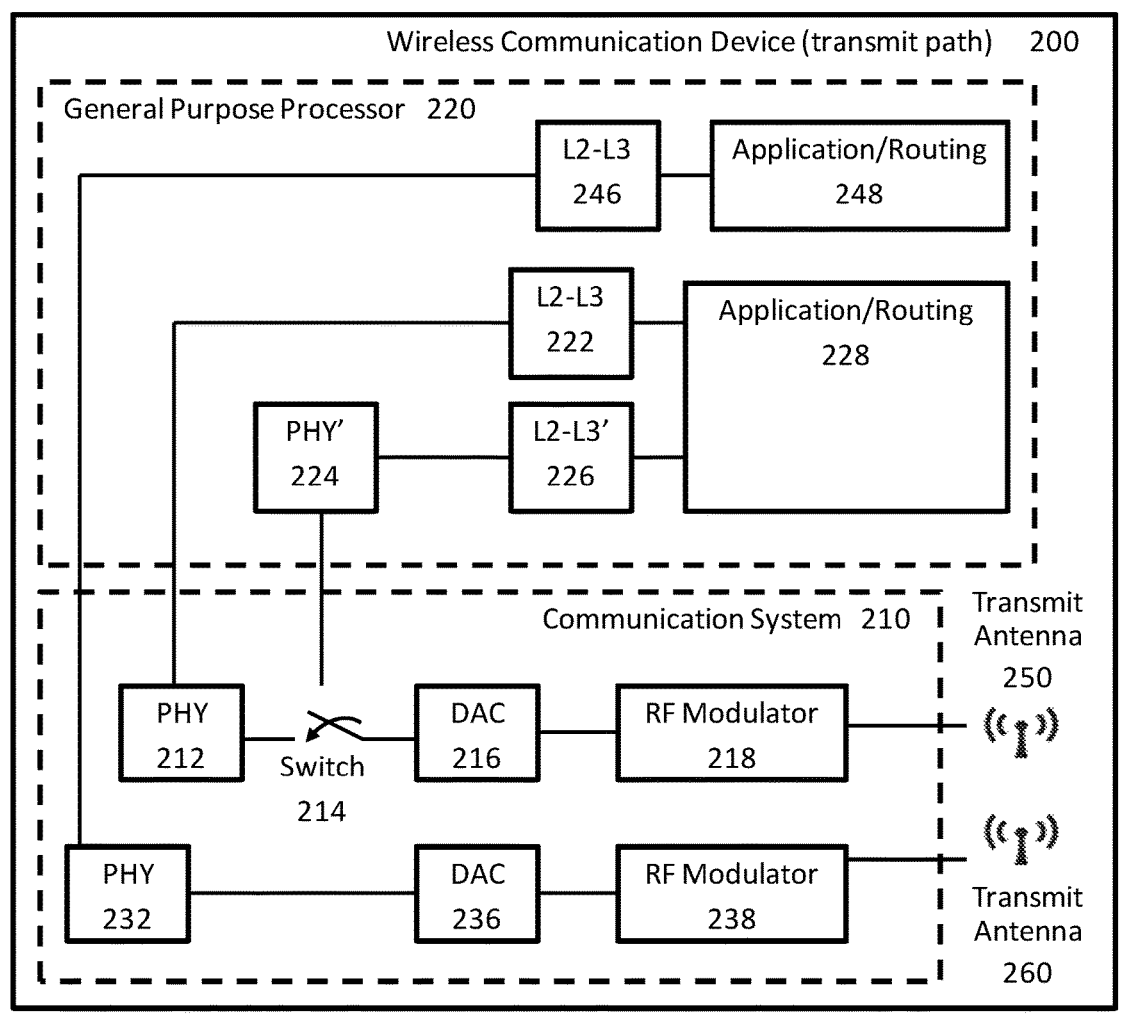
FIG. 2 shows a system diagram describing the transmit path of a non-limiting exemplary embodiment of the present disclosure which includes a communication system supporting two communication protocols.

Referring now to the present disclosure, FIG. 2 shows the transmit paths 200 of a typical wireless communication device in one exemplary implementation of this disclosure. Unlike the communication device depicted in FIG. 1 which supports a single communication protocol, the communication device depicted in FIG. 2 supports two independent communication protocols. Referring again to FIG. 2, the communication elements 212, 214, 216, 218, 222, 224, 226, 228, and 250 operate in an identical manner to communication elements 112, 114, 116, 118, 122, 124, 126, 128, and 150, respectively of FIG. 1, as described earlier. However, the wireless communication device depicted in FIG. 2 also includes support for a second communication protocol, implemented in elements 232, 236, 238, 246, 248, and 260. Note that the physical layer protocol 232 of this second communication protocol is never bypassed, and continues to operate according to the communication protocol whose physical layer 232 is implemented in communication system 210.

Referring again to FIG. 2, and according to one embodiment of the present disclosure, control software executed in general purpose processor 220 (and not depicted in FIG. 1) will instruct bypass switch 214 to disconnect the input of DAC 216 from the output of physical layer module 212, and instead connect the input of DAC 216 to the output of a different physical layer module 224 which implements (in software executed on the general purpose processor 220) the physical layer PHY' of a communication protocol that is different from the communication protocol, whose physical layer PHY is implemented in module 212 of communication system 210. The input of physical layer module 224 is connected to the output of a different higher layer protocol (labeled L2-L3') implemented in software in module 226. Finally, the input of higher layer protocol module 226 is connected to the output of application/routing module 228.

Referring again to FIG. 2, and in one non-limiting example, the communication protocol implemented in modules 212 and 222 might be compatible with the WIFI standard, while the communication protocol implemented in modules 232 and 246 might be compatible with the Bluetooth standard.

Figure 3:
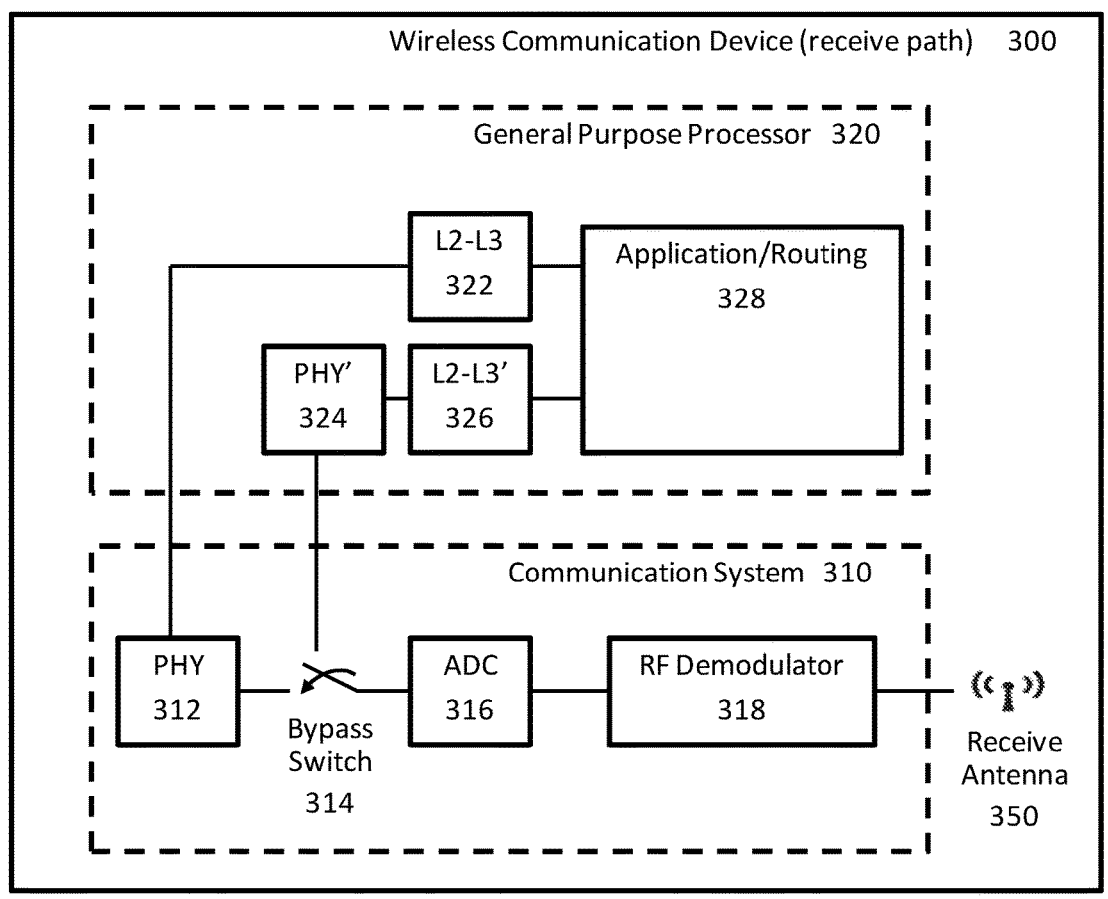
FIG. 3 shows a system diagram describing the receive path of a non-limiting exemplary embodiment of the present disclosure which includes a communication system supporting a single communication protocol.

Referring to the present disclosure, FIG. 3 shows the receive path 300 of a typical wireless communication device in one exemplary implementation of this disclosure. The receive path 300 consists of a communication system 310 and a general purpose processor 320. The wireless communication device depicted in FIG. 3 could be an end device such as a laptop computer with wireless connectivity or a mobile handset, in which case the highest layer of the communication protocol, implemented in module 328, would consist of application layer software such as a web browser, an email application or other application software. Alternatively, the wireless communication device depicted in FIG. 3 could be a router that provides connectivity between other wireless devices (not shown in the figure) and a wired network (also not shown in the figure), in which case the highest layer of the communication protocol, implemented in module 328, would consist of a routing algorithm.

Referring again to FIG. 3, the receive antenna 350 is coupled to a radio frequency demodulator 318 which receives a radio frequency signal from the receive antenna 350 and removes the radio frequency carrier from the received signal, and outputs a signal known to those of ordinary skill in the art as a baseband signal. The baseband signal at the output of the radio frequency demodulator 318 is coupled to the input of an analog-to-digital (ADC) converter 316, where the baseband signal is sampled and converted to a digital baseband signal. Under operation per the current state of the art, bypass switch 314 is in the lower position, coupling the output of the ADC 316 to the input of physical layer module 312. Again under operation per the current state of the art, the output of physical layer module 312 is coupled to the input of module 322 which implements the higher layers of the communication protocol whose physical layer is implemented in module 312. Finally, the output of module 322 is coupled to the input of module 328 which implements application layer and/or routing protocols, resulting in the reception, and decoding, of a radio frequency signal compatible with the protocol whose physical layer is implemented in module 312 and whose higher layer protocols are implemented in module 322.

Referring again to FIG. 3, and according to one embodiment of the present disclosure, control software executed in general purpose processor 320 (and not depicted in FIG. 3) will instruct bypass switch 314 to disconnect the output of ADC 316 from the input of physical layer module 312, and instead connect the output of ADC 316 to the input of a different physical layer module 324 which implements (in software executed on the general purpose processor 320) the physical layer PHY' of a communication protocol that is different from the communication protocol whose physical layer PHY is implemented in module 312 of communication system 310. The output of physical layer module 324 is connected to the input of a different higher layer protocol (labeled L2-L3') implemented in software in module 326. Finally, the output of higher layer protocol module 326 is connected to the input of application/routing module 328.

Figure 4:
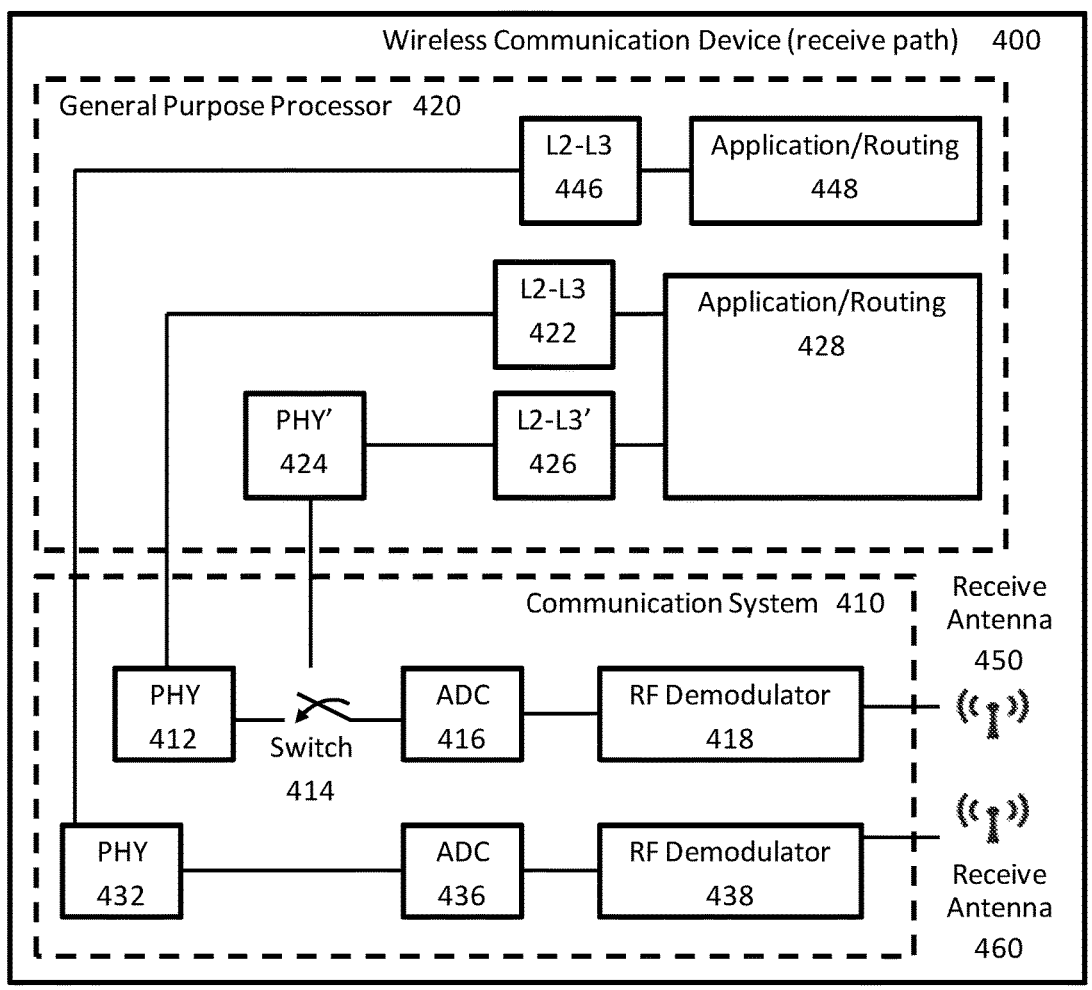
FIG. 4 shows a system diagram describing the receive path of a non-limiting exemplary embodiment of the present disclosure which includes a communication system supporting two communication protocols.

Referring now to the present disclosure, FIG. 4 shows the receive paths 400 of a typical wireless communication device in one exemplary implementation of this disclosure. Unlike the communication device depicted in FIG. 3 which supports a single communication protocol, the communication device depicted in FIG. 4 supports two independent communication protocols. Referring again to FIG. 4, the communication elements 412, 414, 416, 418, 422, 424, 426, 428, and 450 operate in an identical manner to communication elements 312, 314, 316, 318, 322, 324, 326, 328, and 350, respectively of FIG. 3, as described earlier. However, the wireless communication device depicted in FIG. 4 also includes support for a second communication protocol, implemented in elements 432, 436, 438, 446, 448, and 460. Note that the physical layer protocol 432 of this second communication protocol is never bypassed, and continues to operate according to the communication protocol whose physical layer 432 is implemented in communication system 410.

Referring again to FIG. 4, and according to one embodiment of the present disclosure, control software executed in general purpose processor 420 (and not depicted in FIG. 4) will instruct bypass switch 414 to disconnect the output of ADC 416 from the input of physical layer module 412, and instead connect the output of ADC 416 to the input of a different physical layer module 424 which implements (in software executed on the general purpose processor 420) the physical layer PHY' of a communication protocol that is different from the communication protocol, whose physical layer PHY is implemented in module 412 of communication system 410. The output of physical layer module 424 is connected to the input of a different higher layer protocol (labeled L2-L3') implemented in software in module 426. Finally, the output of higher layer protocol module 426 is connected to the input of application/routing module 428.

It is known to those of ordinary skill in the art that in FIGS. 1 through 4, the elements depicted within the General Purpose Processors 120, 220, 320, 420 are typically software modules implemented in one or more programming languages, while the elements depicted within the communication systems 110, 210, 310, 410 may be a combination of hardware modules and software modules.

It is further known to those of ordinary skill in the art that a typical wireless communication device consists of both a wireless transmit path and a wireless receive path, and software modules that are part of the transmit path and the receive path of a typical wireless communication device may be implemented in a single general purpose processor.

It must be noted that in FIGS. 1 through 4, each bypass switch implemented in one of the wireless communication devices 100, 200, 300, 400, is under the control of software running in the general purpose processor of said wireless communication device.

Other elements known to those of ordinary skill in the art to exist in a typical wireless communication device, but which are not critical to the present disclosure (for example filters and amplifiers), are not depicted in FIGS. 1 through 4, so as to avoid obscuring the disclosure.

In the examples depicted in FIGS. 1 through 4, only the physical layer of each communication protocol is implemented in the communication systems 110, 210, 310, and 410, respectively, while the higher layer protocols are implemented in software modules executing on the general purpose processor 120, 220, 320, and 420, respectively. However, it must be noted that there exist other implementations in which some or all of the higher layer portions of a communication protocol may be implemented as part of the communication system.

Figure 5:
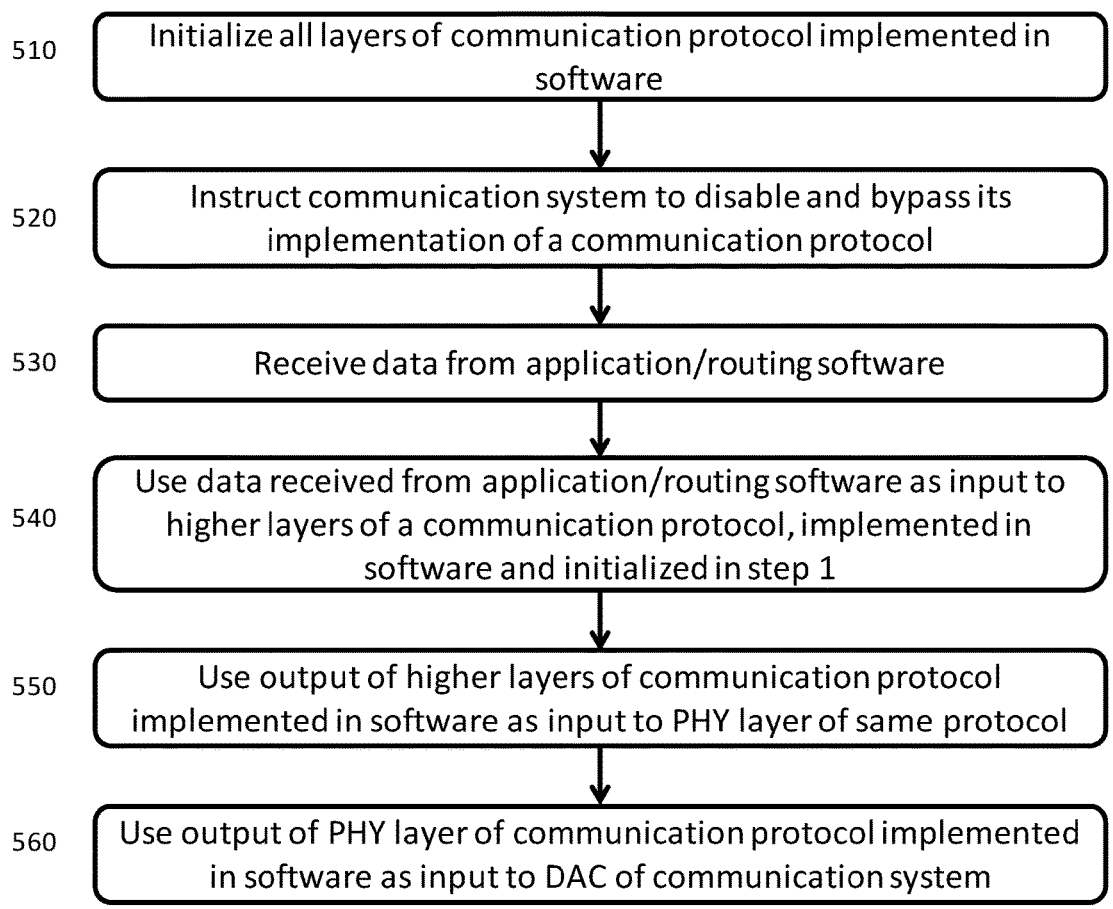
FIG. 5 shows a flow chart detailing a non-limiting exemplary method for use within the systems of FIG. 1 and FIG. 2.

FIG. 5 is a flow chart of an embodiment of a method in accordance with the present invention. In particular, FIG. 5 presents a method for use in conjunction with one or more of the transmit functions and features described in conjunction with FIG. 1 and FIG. 2. In step 510, a communication protocol implemented in software in a general purpose processor is initialized. In step 520, control software executing on a general purpose processor instructs a communication system, implementing part or all of one or more communication protocols, to disable its implementation of a communication protocol. In step 530, the higher layers of a communication protocol implemented in software in a general purpose processor start receiving data from an application and/or routing function. In step 540, the higher layers of the communication protocol implemented in software in the general purpose processor are applied to the data received from the application and/or routing function. In step 550, the physical layer of the same communication protocol implemented in software in the general purpose processor receives the output of the higher layers mentioned in step 540. In step 560, the physical layer mentioned in step 550 generates a digital baseband signal appropriate for the input of a digital-to-analog converter implemented in the communication system mentioned in step 520.

Figure 6:
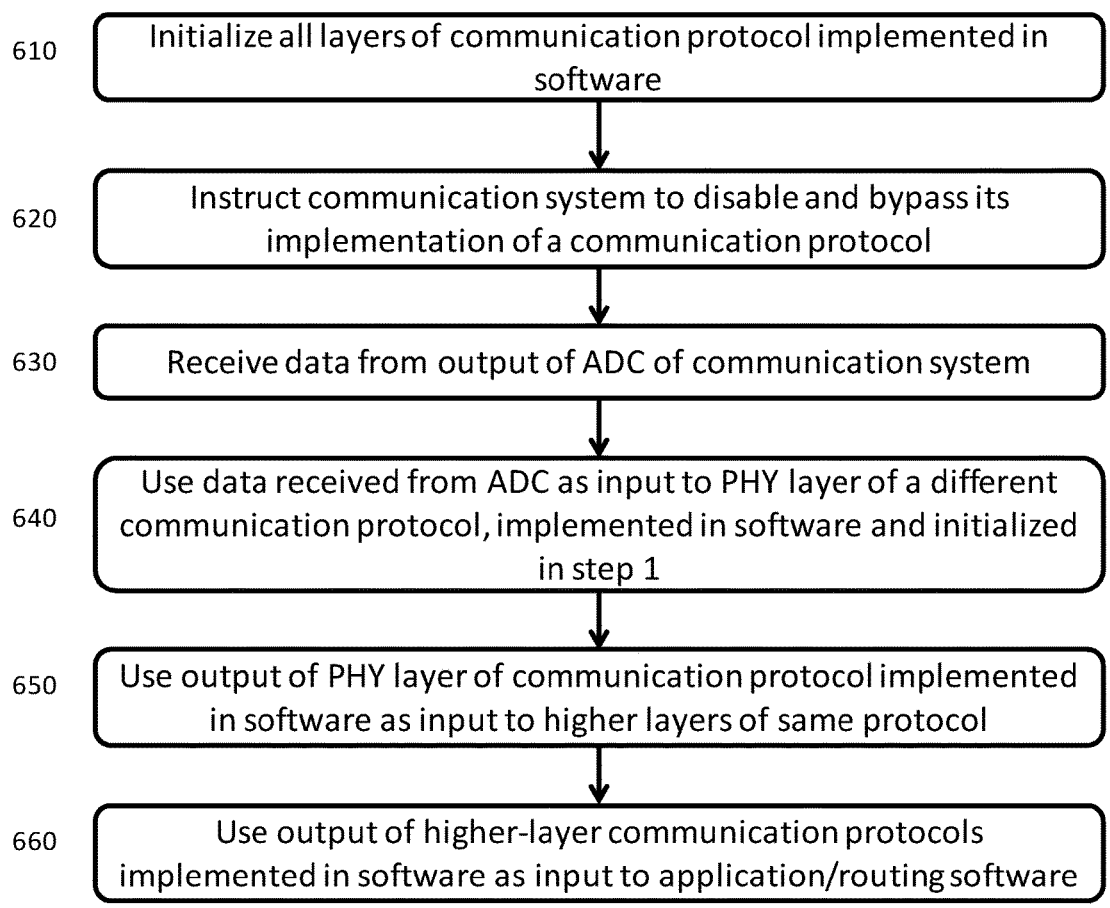
FIG. 6 shows a flow chart detailing a non-limiting exemplary method for use within the systems of FIG. 3 and FIG. 4.

FIG. 6 is a flow chart of an embodiment of a method in accordance with the present invention. In particular, FIG. 6 presents a method for use in conjunction with one or more of the receive functions and features described in conjunction with FIG. 3 and FIG. 4. In step 610, a communication protocol implemented in software in a general purpose processor is initialized. In step 620, control software executing on a general purpose processor instructs a communication system, implementing part or all of one or more communication protocols, to disable its implementation of a communication protocol. In step 630, the protocol implemented in software in a general purpose processor starts receiving a baseband signal from the output of an analog-to-digital converter in the communication system. In step 640, the physical layer of the communication protocol implemented in software in the general purpose processor is applied to the data received from the analog-to-digital converter of the communication system. In step 650, the higher layer protocols of the same communication protocol implemented in software in the general purpose processor receive the output of the physical layer mentioned in step 640. In step 660, the higher layer protocols mentioned in step 650 generate data appropriate for an application and/or routing function.

What is claimed is:

1. A wireless communication device including a transmitter comprising:
   at least one communication system implementing at least one wireless communication protocol, and coupled to at least one general purpose processor;
   wherein said at least one communication system further includes at least one radio frequency modulator for generating radio frequency signals for transmission over airwaves;
   wherein said at least one communication system further includes at least one digital-to-analog converter, coupled to said at least one radio frequency modulator, said digital-to-analog converter being used to convert baseband digital signals to baseband analog signals for use by the at least one radio frequency modulator;
   wherein said at least one communication system further includes at least one digital processor, coupled to said at least one digital-to-analog converter, that implements at least one layer of the at least one wireless communication protocol;
   wherein control instructions sent from said at least one general purpose processor are used to remove said coupling between said at least one digital processor and said at least one digital-to-analog converter;
   wherein said at least one general purpose processor implements, in software, at least one communication protocol that is not fully supported by said at least one communication system;
   wherein said at least one general purpose processor sends to said at least one communication system, a baseband digital signal compliant with said at least one wireless communication protocol implemented in software by said at least one general purpose processor; and
   wherein said at least one communication system uses its at least one digital-to-analog converter to convert said digital data to analog data and uses its at least one radio frequency modulator to modulate said analog data to a carrier frequency appropriate for transmission over the air.

2. The system of claim 1, wherein said at least one communication system is implemented in one or more integrated circuits and said at least one general purpose processor is implemented in one or more integrated circuits.

3. The system of claim 1, wherein said at least one communication system and said at least one general purpose processor are implemented in a single integrated circuit.

4. The system of claim 1, wherein said at least one wireless communication protocol disabled in said at least one communication system is the physical layer of at least one communication protocol.

5. The system of claim 1, wherein said radio frequency modulator also includes an intermediate frequency modulator.

6. The system of claim 1, wherein said at least one communication system also supports at least a second communication protocol that is not disconnected from other components of said at least one communication system.

7. The system of claim 1, wherein at least one of said wireless communication protocols implemented in said at least one communication system is disabled through control instructions sent from said at least one general purpose processor.

8. A wireless communication device including a receiver comprising:
   at least one communication system implementing at least one wireless communication protocol, and coupled to at least one general purpose processor;
   wherein said at least one communication system further includes at least one radio frequency demodulator for receiving radio frequency signals and converting them to a baseband analog signal;
   wherein said at least one communication system further includes at least one analog-to-digital converter, coupled to said at least one radio frequency demodulator, said analog-to-digital converter being used to convert baseband analog signals generated by said at least one radio frequency demodulator to baseband digital signals;
   wherein said at least one communication system further includes at least one digital processor, coupled to said at least one analog-to-digital converter, that implements at least one layer of the at least one wireless communication protocol;
   wherein control instructions sent from said at least one general purpose processor are used to remove said coupling between said at least one digital processor and said at least one analog-to-digital converter;

wherein said at least one general purpose processor implements, in software, at least one communication protocol that is not fully supported by said at least one communication system;

wherein said at least one communication system uses its at least one radio frequency demodulator to demodulate said received radio frequency signal generating a baseband analog signal, and uses its at least one analog-to-digital converter to convert said analog signal to a baseband digital signal; and wherein said at least one general purpose processor receives from said at least one communication system, a baseband digital signal compliant with said at least one wireless communication protocol implemented in software by said at least one general purpose processor.

9. The system of claim 8, wherein said at least one communication system is implemented in one or more integrated circuits and said at least one general purpose processor is implemented in one or more integrated circuits.

10. The system of claim 8, wherein said at least one communication system and said at least one general purpose processor are implemented in a single integrated circuit.

11. The system of claim 8, wherein said at least one wireless communication protocol disabled in said at least one communication system is the physical layer of at least one communication protocol.

12. The system of claim 8, wherein said radio frequency modulator also includes an intermediate frequency modulator.

13. The system of claim 8, wherein said at least one communication system also supports at least a second communication protocol that is not disconnected from other components of said at least one communication system.

14. The system of claim 8, wherein at least one of said wireless communication protocols implemented in said at least one communication system is disabled through control instructions sent from said at least one general purpose processor.

15. A method for modifying a communication device that includes at least one general purpose processor and at least one communication system that supports at least one communication protocol, said communication protocol including at least one physical layer protocol and one higher layer protocol in both transmit and receive directions, said communication protocol including at least one physical layer protocol and one higher layer protocol in both transmit and receive directions, comprising:

using control instructions from said at least one general purpose processor to disable the at least one communication protocol implemented in said at least one communication system by disconnecting said at least one communication protocol from other components of said at least one communication system;

implementing in software, on said at least one general purpose processor, transmit and receive components of at least one protocol layer of at least one communication protocol that is different than the at least one communication protocol that is disabled in said at least one communication system;

connecting at least one output of the transmit component of said at least one communication protocol implemented in software to the component of said at least one communication system which had been connected to the physical layer of said at least one disabled communication protocol in the transmit direction;

connecting at least one input of the receive component of said at least one communication protocol implemented in software to the component of said at least one communication system which had been connected to the physical layer of said at least one disabled communication protocol in the receive direction; and using said at least one communication system to transmit and receive baseband digital signals compliant with the physical layer component of said at least one communication protocol implemented in software.

16. The method of claim 15, wherein said at least one communication system is implemented in one or more integrated circuits and said at least one general purpose processor is implemented in one or more integrated circuits.

17. The method of claim 15, wherein said at least one communication system and said at least one general purpose processor are implemented in a single integrated circuit.

18. The method of claim 15, wherein at least one communication protocol implemented in said at least one communication system is disabled using control instructions sent from the at least one general purpose processor.

* * * * *